Jan. 6, 1970     W. H. KASTNING ET AL     3,488,624
APPARATUS FOR ESTABLISHING AN ELECTRICAL CONNECTION
Filed Aug. 28, 1967     2 Sheets-Sheet 1

INVENTORS
W. H. KASTNING
B. L. WRIGHT
BY A. C. Schwarz, Jr.
ATTORNEY

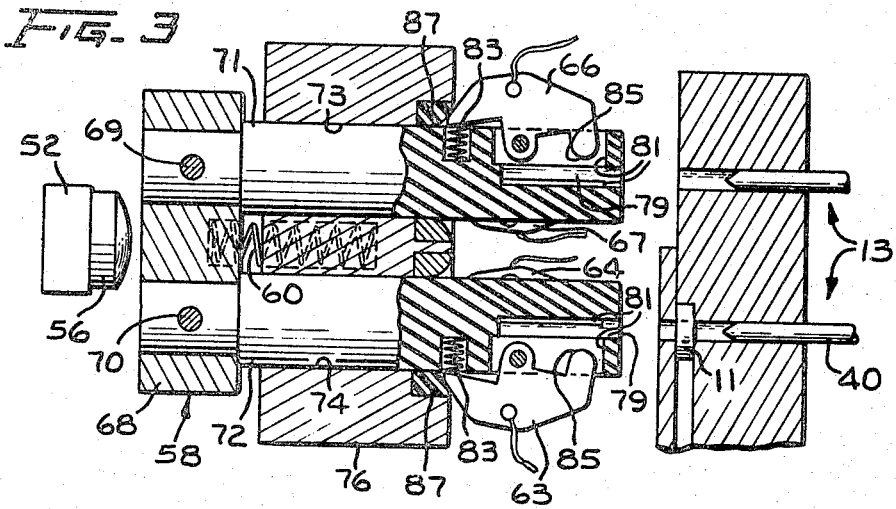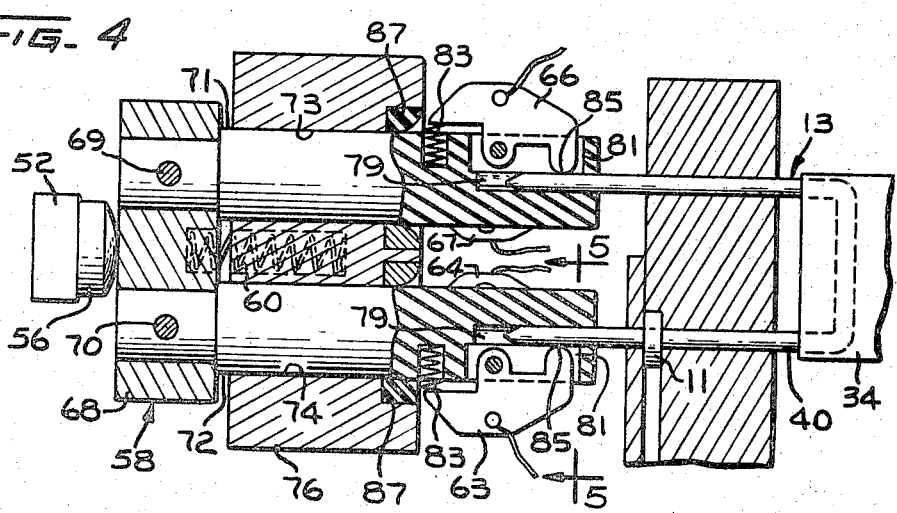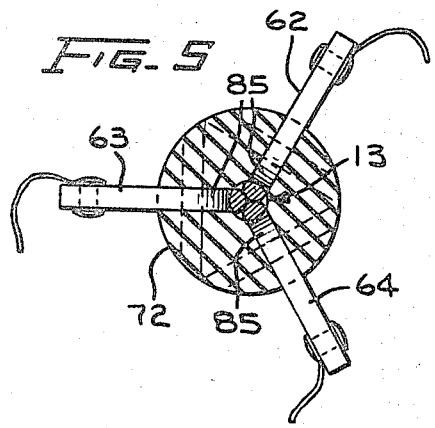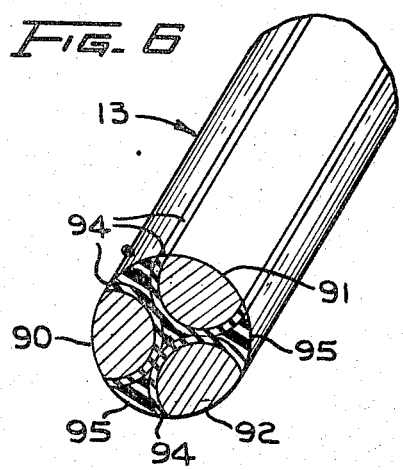

United States Patent Office 3,488,624
Patented Jan. 6, 1970

3,488,624
APPARATUS FOR ESTABLISHING AN ELECTRICAL CONNECTION
William H. Kastning, Naperville, and Ben L. Wright, Chicago, Ill., assignors to Western Electric Company, Incorporated, New York, N.Y., a corporation of New York
Filed Aug. 28, 1967, Ser. No. 663,876
Int. Cl. H01r 13/54, 11/20
U.S. Cl. 339—75                                     6 Claims

ABSTRACT OF THE DISCLOSURE

An apparatus for reliably forming several electrical current paths around a magnetic device by inserting one leg of a U-shaped probe through an opening in the device and making electrical contact to the free ends of the probe before the probe has stopped moving, thereby developing a wiping action between the conductors of the probe and the contacts mating with it to enhance the reliability of the electrical connections between them.

Field of the invention

This invention relates to an apparatus for establishing an electrical connection and particularly to an apparatus for reliably making electrical contact between two conductive surfaces with a wiping action.

Background of the invention

In testing a magnetic device, such as toroidal cores, it is often desirable to form several one-turn electrical windings about a portion of the device. This is usually done by passing at least one conductive probe through an opening in the device and making electrical contact with the free end of the probe. A conductive path around the device then completes one or more electrical circuits. Electrical pulses are passed through one conductor of the probe (functioning as a primary winding) to generate magnetic signals in the tested device (functioning somewhat as the core of a transformer). Voltages are generated in another conductor of the probe (functioning as a secondary winding), and the characteristics of the voltage signals generated in the secondary winding indicates some of the magnetic characteristics of the device. However, when using single-turn primary and secondary windings, the voltages generated are very low; and the electrical contact made at the free end of the probe must be of very low ohmic resistance.

A contact of low ohmic resistance usually requires considerable contact pressure. However, some magnetic devices are very small, and the probes used to test them must have a very small diameter, thereby causing the probe to buckle if too much axial force is applied to it. Therefore, it is an object of the present invention to provide a good electrical connection to a probe of small diameter without applying an excessive axial force on the probe.

It is another object of the present invention to assure that when two electrical conductors are brought into intimate mechanical contact, a reliable electrical connection exists between them.

It is yet another object of the present invention to provide an apparatus for making a reliable electrical connection near a free end of an electrical conductor.

Summary of the invention

In accordance with the present invention, an intimate, reliable electrical connection is made between a first contact surface and a second contact surface by causing a first relative movement between the contact surfaces so as to bring them into juxtaposition with one another, and by causing a second relative movement between the contact surfaces during a portion of their relative movement into juxtaposition with one another, so as to cause the contact surfaces to engage each other with a wiping action.

Brief description of the drawings

Other objects, advantages and novel aspects of the invention will become apparent upon consideration of the following detailed description, in conjunction with the accompanying drawings, in which:

FIG. 3 is an enlarged, cross-sectional view of the probe and contact apparatus taken along line 3—3 of FIG. 2;

FIG. 4 is similar to FIG. 3 but shows the probe inserted through the toroidal core and with electrical contact completed through the probe;

FIG. 5 is a cross-sectional view taken along line 5—5 of FIG. 4 and shows an end view of the contact apparatus making electrical contact with the probe; and FIG. 6 is a cross-sectional view in perspective of the probe showing the mutual insulation between the three conductors of which it is formed.

Detailed description

Figure 1:
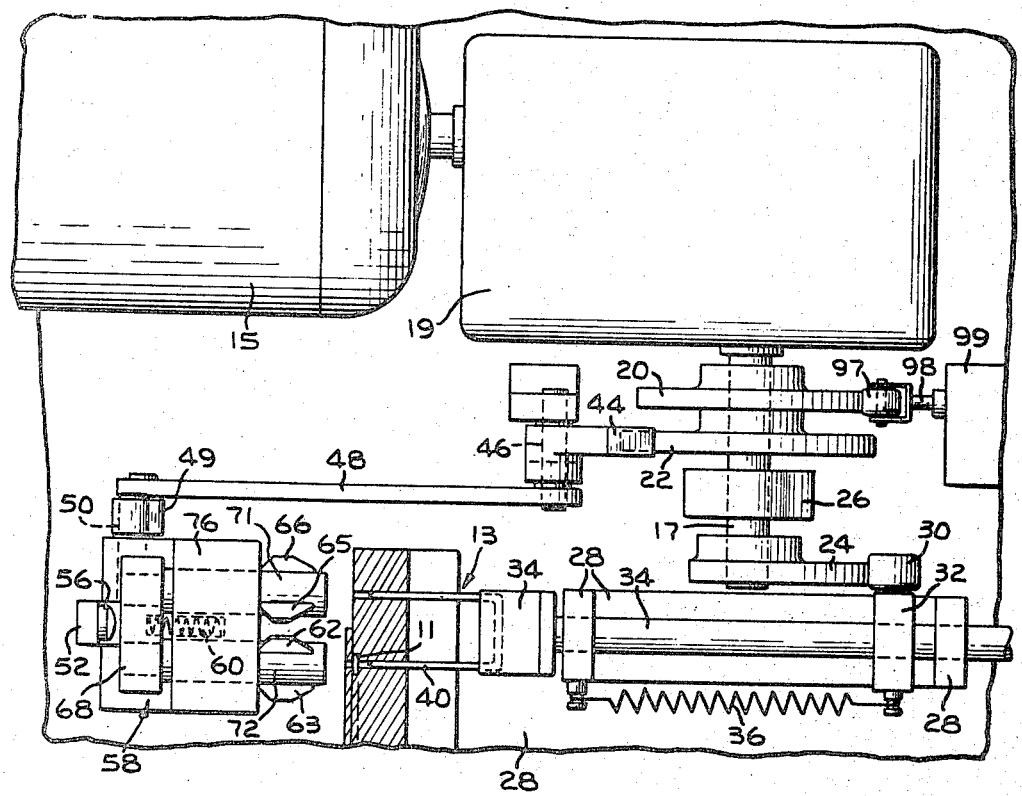
FIG. 1 is a plan view of mechanical apparatus for inserting a conductive probe through a toroidal core to be tested.
Figure 2:
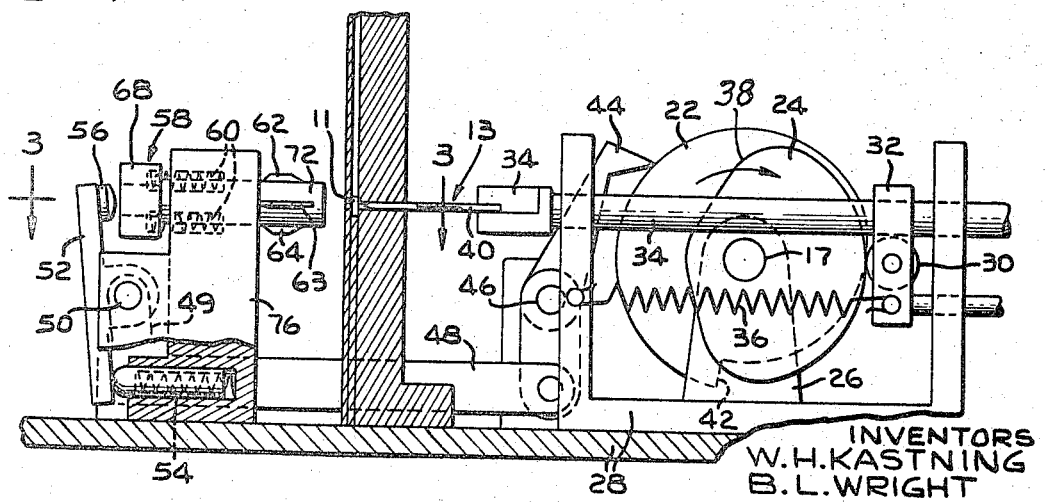
FIG. 2 is a front elevational view of the apparatus of FIG. 1 with several parts shown in cross section or omitted for clarity.

Referring now to the drawings and more particularly to FIGS. 1 and 2, a toroidal magnetic core 11 is shown in the testing position. Apparatus for advancing toroidal magnetic cores into and through the testing position is well known in the prior art and does not form a part of the present invention.

Mechanical power for inserting and retracting a U-shaped test probe 13 through the center of the core 11 is supplied by an electrical motor 15 that drives a cam shaft 17 through a right-angle gear reducer drive 19. A bearing mount 26 supports the cam shaft 17 on a base member 28 on which the motor 15 and the gear reducer 19 are also mounted. Three plate cams 20, 22 and 24 are firmly mounted on the cam shaft 17 for rotation therewith, and a cam follower 30 is rotatably mounted in a bracket 32 that is firmly attached to a plunger 34 on which the U-shaped probe 13 is mounted. A spring 36 urges the plunger 34 and the probe 13 to the left and keeps the cam follower 30 in engagement with the plate cam 24.

When a low portion 38 of the cam 24 permits the cam follower 30 and the plunger 34 to move to the left, as viewed in FIG. 2, under the urging of the spring 36, they carry the probe 13 with them; and a tine 40 of the U-shaped probe 13 passes through the opening of the toroidal core 11.

After the tine 40 of the probe 13 passes through the core 11, but before the probe 13 has stopped moving, a step 42 on the plate cam 22 (FIG. 2) passes a cam follower 44 which rotates clockwise about its pivot shaft 46 and allows a connecting bar 48, to move to the left. The connecting bar 48 is pinned to a crank 49 that is firmly connected to a rotatably-mounted pivot shaft 50. A rocker arm 52 is also firmly connected to the rotatably-mounted pivot shaft 50 and is urged to rotate in the clockwise direction (FIG. 2) by a strong compression spring 54. Therefore, when the step 42 in the plate cam 22 reaches the cam follower 44, the compression spring 54 rotates the rocker arm 52, the pivot shaft 50 and the crank 49 clockwise. Clockwise rotation of the crank 49 draws the connecting bar 48 to the left which rotates the cam follower 44 clockwise about its pivot shaft 46 into the step 42 in the plate cam 22.

When the rocker arm 52 rotates clockwise, a head 56 at one end thereof engages and bears against a contact plunger 58, moving it to the right (FIG. 2) against two bias springs 60. Rightward movement of the contact plunger 58 causes a plurality of contacts 62 through 67 to bear against and grip the sides of the problem 13 which continues moving for a short time so that wiping occurs between the conductors of the probe 13 and the contacts 62 through 67, thereby assuring a reliable electrical connection with the probe.

The contact plunger 58, which is shown in greater detail in FIGS. 3 and 4, is made up of a cap 68 which is fastened to two cylindrical shanks 71 and 72 made of insulating material, by two pins 69 and 70. The shanks 71 and 72 are slidably mounted in two openings 73 and 74 in a frame member 76 that is firmly mounted to the base member 28 of the machine (FIG. 2). Each shank has an axial hole 79 at its right-most end (FIGS. 3 and 4) to accommodate the tines of the U-shaped probe 13. Three radial slots 81 are equally spaced about each of the shanks and open into the associated hole 79. Each of the six contacts 62 through 67 is pivotally mounted in one of the slots 81 and is urged by a bias spring 83 to rotate within its associated slot to project a contact surface 85 into its associated hole 79. When the contact plunger 58 is in the position shown in FIG. 3, with the head 56 of the rocker arm 52 out of engagement with the cap 68, the bias springs 60 push the contact 58 to the left and the left-most ends of the contacts 62 through 67 engage camming surfaces 87, of insulating material, that are mounted in the frame member 76 and which hold the contacts against their associated bias springs 83 in positions in which their associated contact surfaces 85 are held out of their associated holes 79.

When the U-shaped probe 13 moves to the left through the toroidal core 11 and into the holes 79 toward the position shown in FIG. 4, the head 56 of the rocker arm 52 bears on the cap 68 of the contact plunger 58, pushing it to the right against the urging of the springs 60. The contacts then disengage from the camming surfaces 87 and rotate under the urging of their associated bias springs 83 to press their associated contact surfaces 85 into engagement with the sides of the probe 13. The plate cam 24 (FIG. 2) is so cut and is so arranged with respect to the step 42 of the plate cam 22, that the U-shaped probe 13 continues to move a slight distance further to the left after the contact surfaces 85 of the contacts 62 through 67 have fully engaged the tines of the probe 13. This causes the contact surfaces 85 to wipe slightly against the sides of the probe 13, thereby assuring a reliable electrical contact.

The contact force between the surfaces 85 of the contacts 62 through 67 and the probe 13 results in a frictional force between the contacts and the probe as the wiping occurs. This frictional force results in the application of an axial force on the probe. However, this axial force is only a fraction of the contact force and is related to it by the coefficient of friction between the contacts and the probe. Therefore, the axial force with which the probe 13 is advanced is never used to deflect the springs 83.

FIG. 5 is a more detailed illustration of the relationship between the probe 13 and the contacts which bear against the externally-oriented contact surfaces along the side of each tine of the probe. The contacts 62 through 64 are shown equally spaced about the circumference of the shank 72, with their internally-oriented contact surfaces 85 in engagement with the sides of the probe 13.

The probe 13, shown in greater detail in FIG. 6, is made up of three prismatic conductors 90, 91, and 92 each insulated from the others by insulators 94 and each forming an externally-oriented contacting surface. A filler 95 of insulating material in the area between the insulators 94 fills out the cross section of the probe 13 to form a structure of cylindrical shape. This constitutes a three-conductor probe that engages with the three contacts of each of the two shanks 71 and 72 to form three electrically-insulated, single-turn windings through the toroidal core 11.

After the probe 13 has come to rest inside the holes 79 of the two shanks 71 and 72, the plate cam 20 (FIG. 1) moves a cam follower 97 that is connected to an actuating arm 98 of a switch 99 that signals suitable electronic circuitry (not shown) that the electrical windings through the toroidal core 11 have been completed and that test signals can be sent to and received from the contacts 62 through 67. The test circuitry for sending signals to the probe and for evaluating the signals generated in the probe is well known in the prior art and forms no part of the present invention.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for establishing an electrical connection, which comprises:
   first and second relatively movable members, each of said members having an electrical contact surface;
   first moving means for causing relative movement between said first and second members so as to bring the electrical contact surfaces into juxtaposed relationship, said members having first relative positions in which the electrical contact surfaces will not engage each other during relative movement of said members by said first moving means, and having second relative positions in which the electrical contact surfaces will engage each other during relative movement of said members by said first moving means;
   second moving means causing relative movement between said first and second members from their first relative positions to their second relative positions; and
   control means for rendering said second moving means operative during a portion of the relative movement of said first and second members by said first moving means, to cause the electrical contact surfaces of said members to engage each other with a wiping action so as to establish an electrical connection between the electrical contact surfaces.

2. Apparatus for establishing an electrical connection, as recited in claim 1, in which:
   said first member extends in at least one direction for a relatively substantial distance;
   said first moving means causes relative movement between said first and second members in the one direction; and
   said control means renders said second moving means operative so that the electrical contact surface of said second member engages the electrical contact surface of said first member at an intermediate point on said first member as measured in the one direction.

3. Apparatus for establishing an electrical connection, as recited in claim 1, in which:
   said first member is in the form of a relatively elongated rod having at least one free end;
   said first moving means causes relative movement between said rod and said second member in a direction parallel to the longitudinal axis of said rod and so that the free end of said rod and the electrical contact surface on said second member move past one another; and
   said control means renders said second moving means operative after the free end of said rod and the electrical contact surface on said second member have moved past one another, so that the electrical contact surfaces on said rod and said second member first engage at a point spaced from the free end of said rod.

4. Apparatus for establishing an electrical connection, as recited in claim 1, in which said control means comprises:
   means for retaining said second member in its first position relative to said first member during a portion of the relative movement of said members by said first moving means; and
   means for causing release of said second member by said retaining means during a subsequent portion of the relative movement of said first and second members by said first moving means, to permit the relative movement of said members from their first relative positions to their second relative positions by said second moving means.

5. Apparatus in accordance with claim 1, in which:
   said first member includes a plurality of mutually insulated conductors arranged to form a unitary structure, with each conductor having an electrical contact surface;
   a plurality of said second members are provided, one for each of said conductors, said second members being mutually insulated and each having an electrical contact surface for engaging the electrical contact surface of its respective conductor to establish an electrical connection;
   said first moving means causes relative movement between said first member and said second members so as to bring respective ones of the electrical contact surfaces of said conductors and said second members into juxtaposed relationship; and
   said second moving means causes relative movement between said first member and said second members to cause respective ones of the electrical contact surfaces of said conductors and said second members to engage each other with a wiping action.

6. Apparatus in accordance with claim 5, in which:
   said first member is in the form of an elongated probe having at least one free end;
   said second members are circumferentially arranged to form a socket for receiving said probe;
   said first moving means causes relative movement between said probe and said second members in a direction parallel to the longitudinal axis of said probe and so that the free end of said probe moves past the electrical contact surfaces on said second members; and
   said control means renders said second moving means operative after the free end of said probe has moved past the electrical contact surfaces on said second members, so that the electrical contact surfaces on said probe and said second members first engage at points spaced from the free end of said probe.

References Cited

UNITED STATES PATENTS

| | | | |
|---|---|---|---|
| 3,275,967 | 9/1966 | Hamm | 339—61 |
| 3,378,810 | 4/1968 | Dorrell | 339—95 |
| 3,392,329 | 7/1968 | Gulbis | 324—34 |

MARVIN A. CHAMPION, Primary Examiner

JOSEPH H. McGLYNN, Assistant Examiner

U.S. Cl. X.R.

339—95